UNITED STATES PATENT OFFICE.

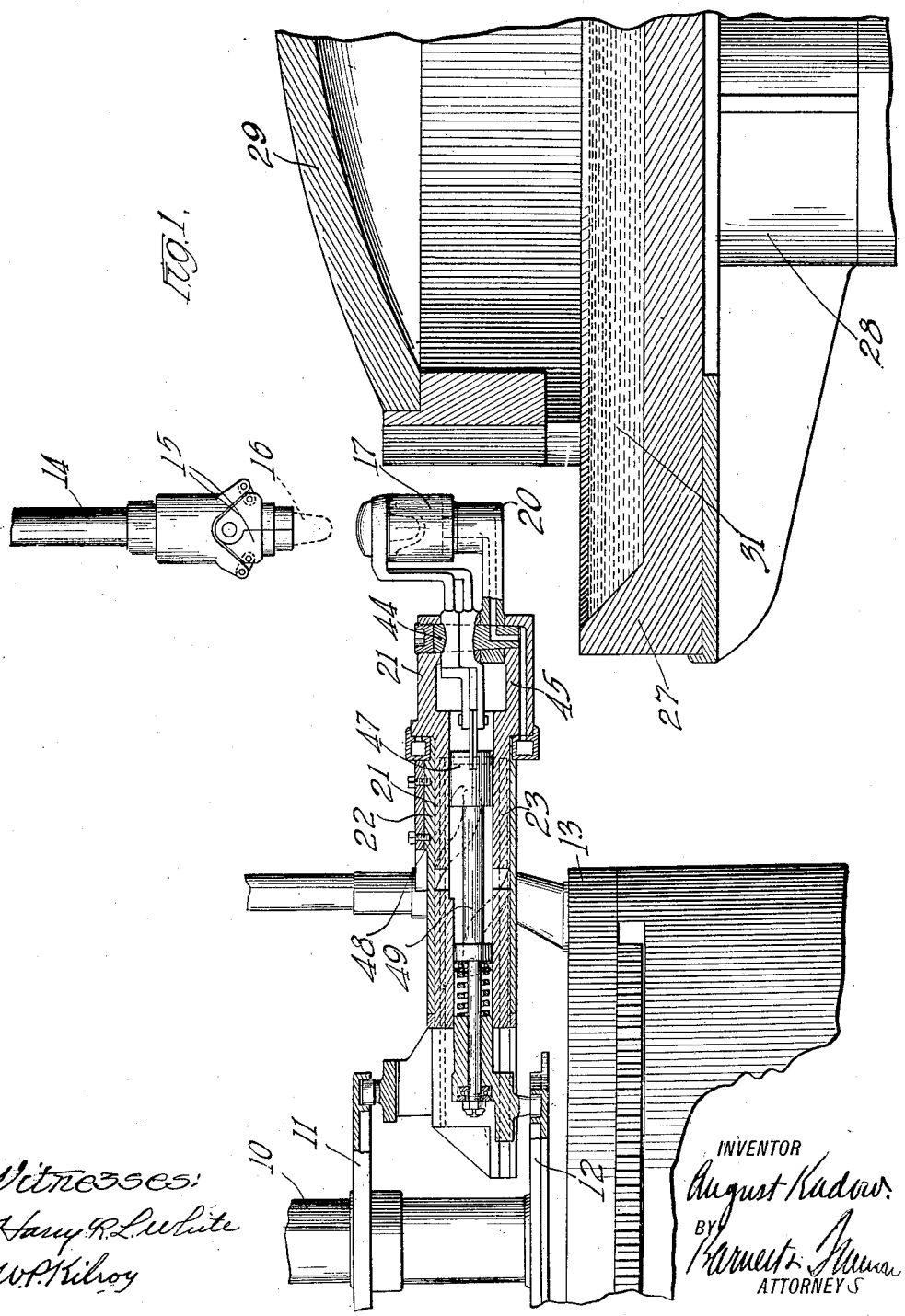

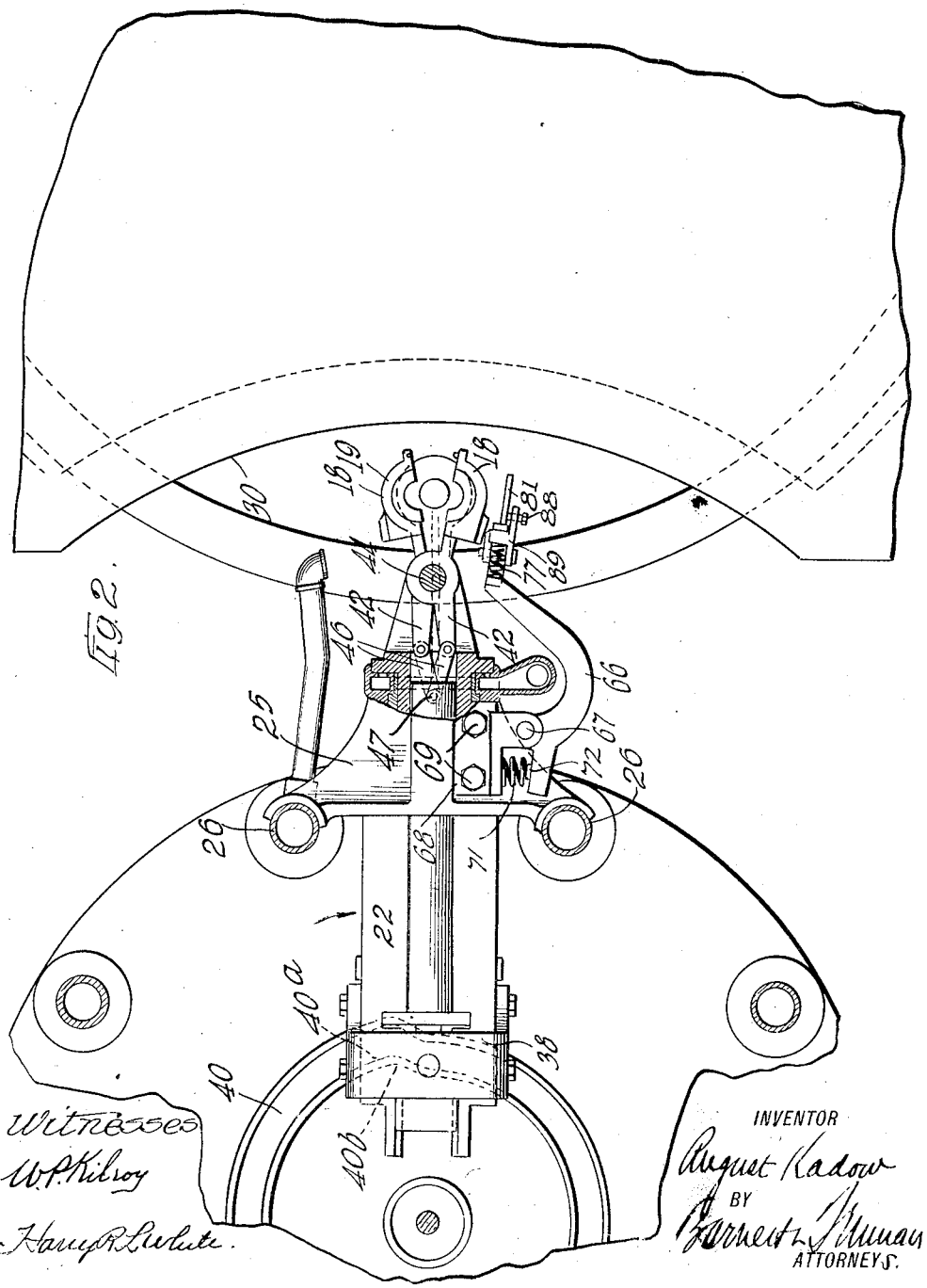

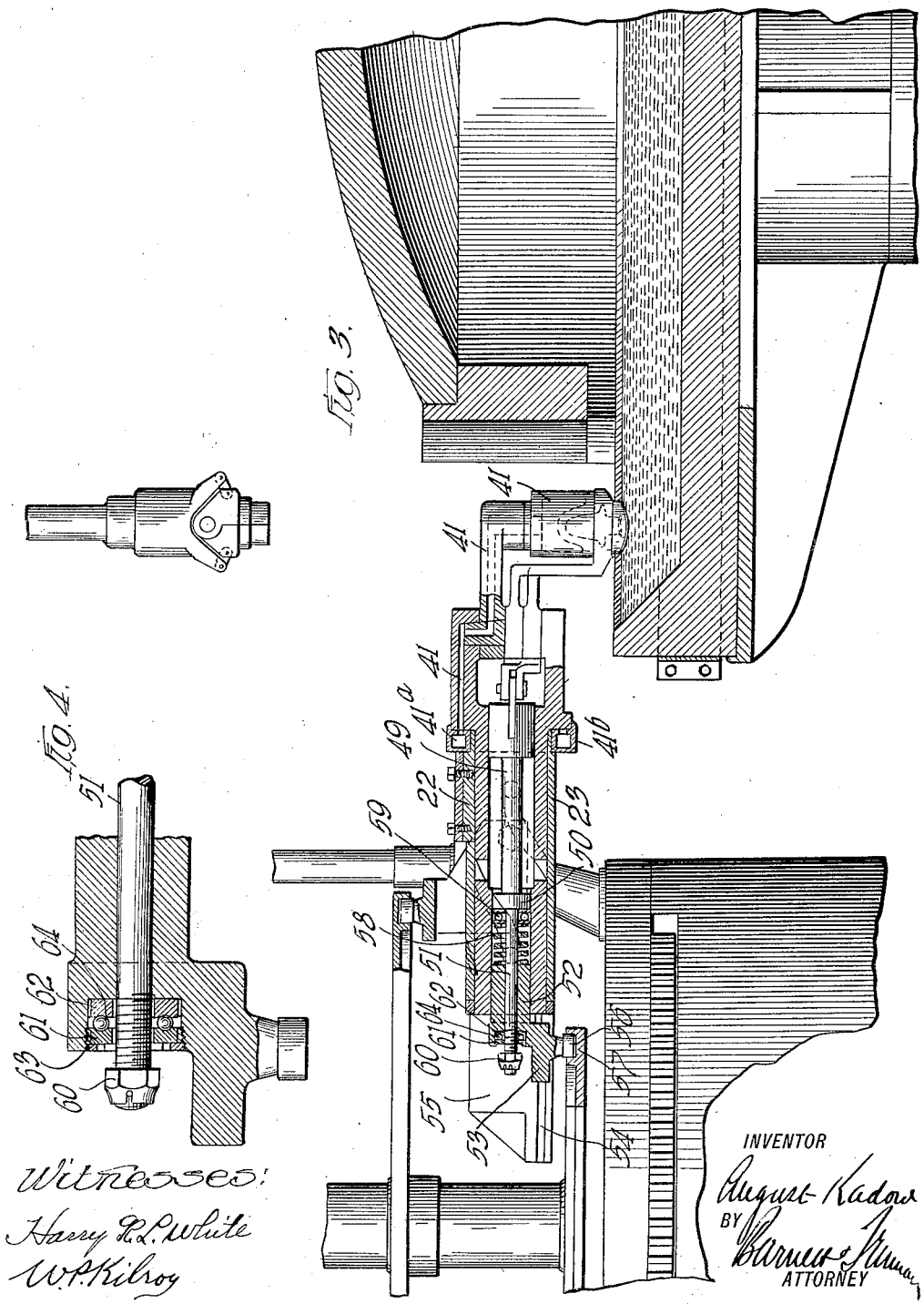

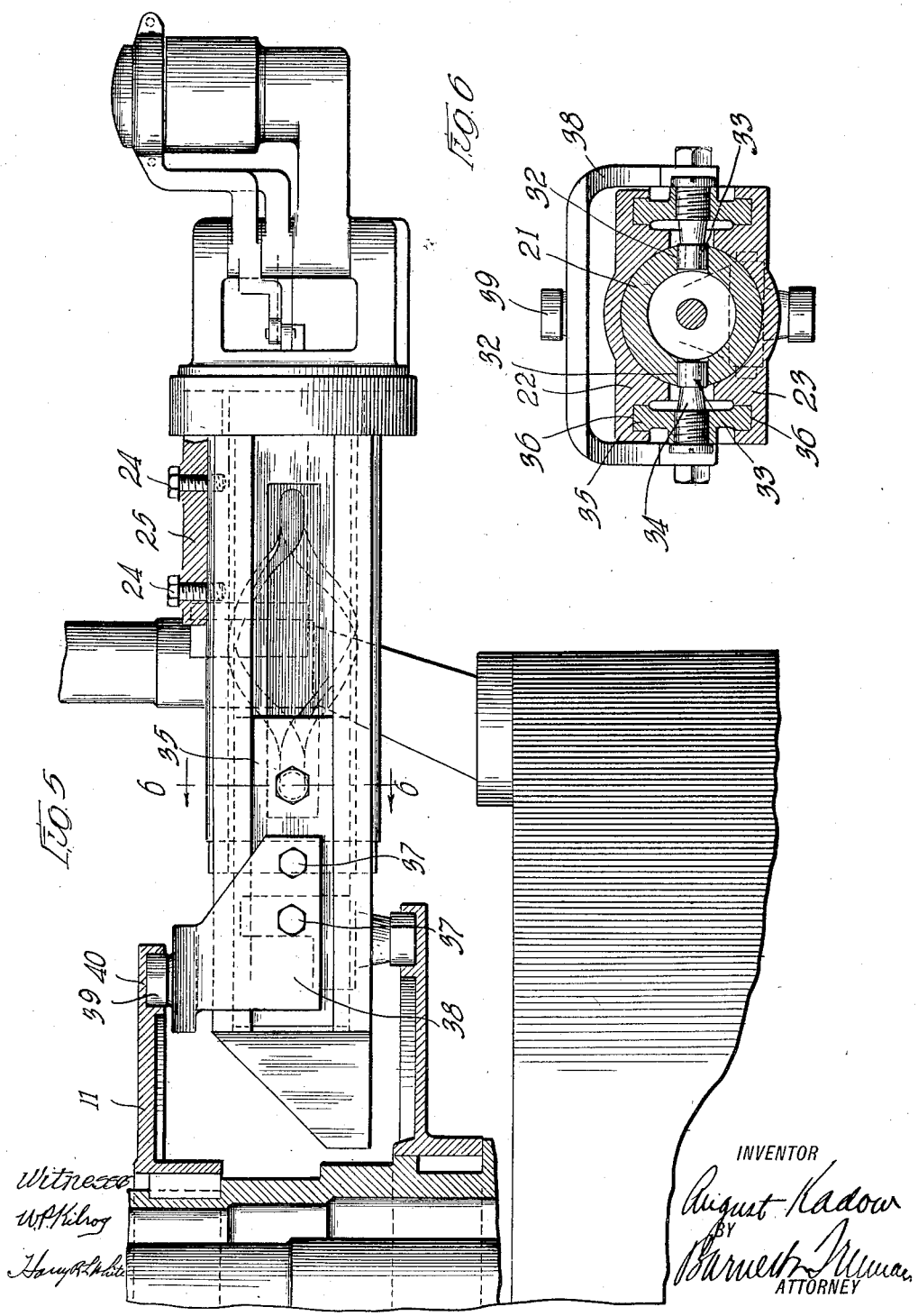

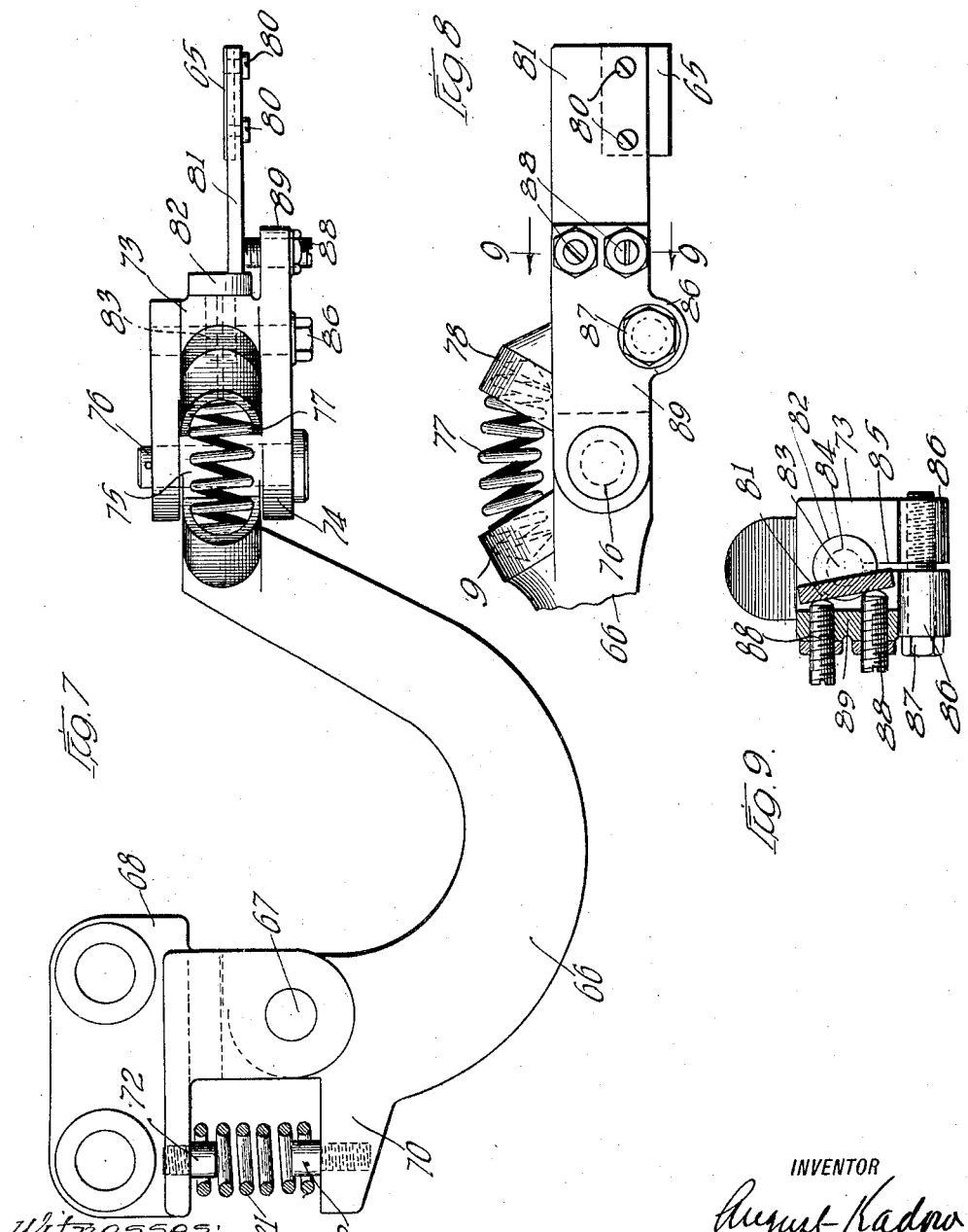

AUGUST KADOW, OF TOLEDO, OHIO, ASSIGNOR TO THE WESTLAKE MACHINE COMPANY, OF TOLEDO, OHIO, A CORPORATION OF OHIO.

GLASS-GATHERING MECHANISM.

1,350,552.      Specification of Letters Patent.      Patented Aug. 24, 1920.

Application filed May 25, 1917. Serial No. 170,895.

*To all whom it may concern:*

Be it known that I, AUGUST KADOW, a citizen of the United States, residing at Toledo, in the county of Lucas and State of Ohio, have invented certain new and useful Improvements in Glass-Gathering Mechanism, of which the following is a specification.

My invention relates to the manufacture of glass articles by automatic machinery, and more particularly, to the means employed for gathering the glass from the tank or furnace in the form of blanks for subsequent treatment by blowing or other operation.

One of the primary objects of the invention is to provide a gathering mechanism in which the element supporting the gathering mold is, generally speaking, elbow-shaped or angular and the mold dipped into the glass in the tank or furnace and withdrawn from the same by a rotary movement of this supporting element.

A further object of the invention is to provide a mold, which may be opened for the discharge of the blank, together with automatically operated mechanism for opening and closing the mold at proper intervals.

A further object is to provide means for cutting off the surplus glass from the gathering mold as the mold is rotated from its gathering position.

The invention consists in the novel constructions, arrangements and devices to be hereafter described and claimed for carrying out the above stated objects and such other incidental objects as will appear from the following description.

The invention is illustrated, in a preferred embodiment, in the accompanying drawings, wherein—

Figure 1 is a sectional view of the gathering apparatus and associated portions of the machine with certain parts in elevation; this figure showing the gathering mold in the position which it assumes before it is dipped into the furnace.

Fig. 2 is a plan view of the apparatus shown in Fig. 1, the relative positions of the different parts of the mechanism being the same as in Fig. 1.

Fig. 3 is a view similar to Fig. 1 but showing the mold in the gathering position.

Fig. 4 is a detail section, on a larger scale, of the plunger for effecting the opening and closing movements of the neck molds or openable mold sections.

Fig. 5 is a side elevation of the gathering mechanism.

Fig. 6 is a cross sectional view on line 6—6 of Fig. 5.

Fig. 7 is a plan view of the cut-off device.

Fig. 8 is a side elevation of the outer end of the same, and

Fig. 9 is a cross sectional view on line 9—9 of Fig. 8.

Like characters of reference designate like parts in the several figures of the drawings.

The gathering mechanism of my invention is shown as constituting a part of the glass forming machine in which there are a plurality of glass forming units arranged on a rotary supporting frame, the movement of which frame acts, through the instrumentality of cams, to bring about, automatically, the actuation of the several mechanisms constituting said units. In the preferred form of apparatus shown, each unit comprises a gathering device (the subject of this invention), a blow-pipe or spindle, which receives the blank gathered and formed by the gathering device, and certain other devices which need not be referred to as they have no particular relation to the present invention. As one of these units is brought opposite the working opening of the furnace its gathering device operates to make a gather, whereupon the blank so formed is delivered to the blow-pipe and thereafter subjected to certain operations with which my present invention is not concerned.

Referring to the drawings, 10 designates a stationary structure provided with cam rings 11 and 12, and 13 is a rotary structure supporting the glass forming units above referred to. The blow-pipe is indicated at 14 and may be of any preferred construction. It is shown as comprising hinged mold sections 15, 15 which are opened at the proper time to receive the glass blank gathered by the gathering device; whereupon the mold sections close upon the blank. The blank is shown in dotted lines at 16 (Fig. 1). The mechanisms for actuating the movements of the blow-pipe are not here concerned. The blow-pipe is shown simply to illustrate the disposition which is made of the blanks formed by the gathering device.

The gathering device comprises a mold 17 provided at its gathering end with hinged mold sections or neck molds 18 formed with semi-circular recesses 19 on their inner faces which together constitute the gathering opening, when the neck molds are closed, through which openings the glass is drawn up into the mold from the glass furnace by suction. The body portion 17 of the mold is provided with an angular or elbow-shaped shank 20, the end of which is fixed within the end of a revoluble sleeve 21. The latter is supported between an upper guide 22 and a lower guide 23. These guides are preferably integrally united and the structure is secured by bolts 24 to a plate 25 attached to a pair of uprights 26 forming a part of the rotary supporting structure 13 of the machine.

The glass pot 27 of the furnace is carried on a revoluble support 28 and the arch or hood 29 of the furnace is formed with a bay 30 (Fig. 2) which exposes a part of the surface of the body of molten glass 31 so that it is accessible to the gathering mold.

The sleeve 21 to which the gathering mold is secured, as above described, is revolved on its longitudinal axis one hundred and eighty degrees first in one direction and then in the other, whereby the mold is first dipped into the glass and afterward up-ended in position to deliver the blank to the blow-pipe 14 by the following mechanism: The sleeve 21 is formed on opposite sides with spiral slots 32 into which extend rollers 33 carried on studs 34 secured to slides 35 operating in guide-ways 36 in the members 22, 23 revolubly supporting the sleeve 21. The slides 35 are secured by bolts 37 to a yoke 38 which straddles the upper guide member 22. The yoke 38 is provided with a roller 39 which lies in a cam groove 40 formed on the under side of the stationary cam ring 11. The cam groove 40 takes a downward bend, as indicated at 40$^a$ (Fig. 2), which revolves the sleeve so as to turn the mold from the position shown in Fig. 1 to the gathering position indicated in Fig. 3. The cam groove then takes an inward bend, as indicated at 40$^b$, which revolves the sleeve in the opposite direction, bringing the mold back to the discharging position.

The glass is gathered by suction, 41 indicating a part of the duct through which the air is exhausted from the mold. The duct 41 communicates with duct 41$^a$ and a ring 41$^b$ which is carried on the stationary guiding structure 22, 23. The mechanisms for producing and timing the exhaust form no part of my present invention and will not require illustration or description.

The neck molds 18 are supported on arms 42, the arms being pivoted on a stud 44 extending across the end of the enlarged portion of head 45 of sleeve 21. The arms are connected by toggle links 46 to a stud 47 extending through the head 48 of a plunger 49 arranged within sleeve 21, the head 48 of the plunger being slotted for the toggle links. The other end of the plunger is provided with a head 50, the plunger being guided within the sleeve by means of the heads 48, 50, which are circular, and inwardly of the head 50 the plunger has an extension 51 passing through a bore in a plunger 52 also fitted within sleeve 21. The plunger 52 is part of a slide 53 operating in guides 54 formed in webs 55 which project from the upper and lower sleeve guides 22, 23. The slide 53 carries on its under side a roller 56 which operates in a cam groove 57 in the cam ring 12. 58 is a spring interposed between plunger 52 and the head 50 of plunger 49. Preferably an anti-friction thrust bearing 59 intervenes between the spring and head 50. The extension 51 of plunger 49 is provided at its extremity with a stop nut 60 and a thrust bearing for the nut is located in the plunger 53 consisting preferably of loose race-ways 61, 62 held in place by an annular nut 63 and balls 64 between the race-ways. An outward movement of plunger 52 produces a similar movement in plunger 49 closing the neck molds. These movements are brought about by an outward bend in the cam groove 57. In order to insure a tight closure of the neck molds the outward bend of the cam is exaggerated, the difference in the length of movements of plungers 52 and 49 being permitted because of the elastic thrust connection afforded by spring 58. The spring also is a safety expedient preventing injury to the mechanism in case the neck molds should be hindered, for any reason, from closing. When the cam bends inwardly to open the neck molds the thrust of the nut 60 is taken up by the thrust bearing in the plunger 52.

After the gather has been made the surplus glass is sheared off by knife 65 (Figs. 2, 7, 8 and 9) which is supported so as to stand in the path of the mold during the upward or return rotary movement of the latter. This knife is carried by a support yieldingly mounted so that it may be pushed out of the way when the mold is open, the outer end or knife carrying portion of which is also connected with the rest of the support to permit the knife to yield in case the mold, in its rotary movement, should strike against it, or in the event that the glass should have congealed sufficiently to resist the cutting action of the knife. It is possible for the mold to come in contact with the knife, even when the knife is originally correctly adjusted, through the expansion of the metal in the mold under the influence of heat.

The knife supporting device is constructed as follows: 66 is an arm pivoted at 67 to a bracket 68 which is secured by bolts 69 to the plate 25. The arm is provided near pivot 67 with a lug 70 and between this lug and the bracket is arranged a coiled spring 71, the ends of which are held in place by studs 72, 72 in the bracket and lug. The knife carrier 73 has a fork 74 which is pivoted to the extremity 75 of arm 66, the pivot pin being shown at 76. A spring 77 is arranged between a spring pocket 78 on the knife carrier and a spring pocket 79 on the arm 66. The knife 65 is secured by screws 80 to a plate 81 and the plate is provided with a head 82 bearing against the end of the knife carrier, and with a cylindrical shank 83 extending into a socket 84 in the knife carrier, the latter being slit, as indicated at 85 (Fig. 9), and formed with ears 86, 86 for a clamping screw 87. Correct angular adjustment of the knife is brought about through a pair of set screws 88 which are threaded through a web 89 on the knife carrier and bear against the plate 81.

Operation: In Figs. 1 and 2 the parts of the gathering mechanism are shown in the relative positions assumed after a gather has been made and the blank delivered to the blow-pipe 14. As the gathering mechanism approaches the furnace again (the direction of rotation of the machine being indicated by the feathered arrow in Fig. 2) the neck molds are closed by the outward movement of plungers 52, 49 actuated by the outward bend of cam groove 57. This movement might, of course, take place at any time after a blank has been delivered to the blow-pipe and before the gathering mold is in position to make the gather. The mold is turned from the position shown in Fig. 1 to the position shown in Fig. 2, that is, from its discharging position to its gathering position, by the revolution of sleeve 21 brought about by the forward movement of the rollers 33 in the spiral slots 32 in the sides of the sleeve 21. The movement of the slides 35, on which rollers 33 are carried, is brought about by an outward bend of the cam groove 40, the roller 39 which lies in this groove being carried by the yoke 38 to which slides 35 are attached.

The upward movement of the gathering mold, from the position of Fig. 3 to the position of Fig. 1, causes the gathering end of the mold to pass by knife 65 and the knife shears off any surplus glass that may have adhered to the mold or the blank therein. If the mold happens to strike against the knife, due to misadjustment of the knife or expansion of the mold under the influence of heat, the knife carrier 73 will yield upwardly compressing spring 77 so that the cut-off mechanism will not be damaged. When the neck molds open the one on the side of the cut-off mechanism will bear against the knife carrier and cause the arm 66 to yield backwardly, compressing spring 71.

While I have described my invention as associated with coöperating glass forming elements in a well known type of machine for manufacturing glass articles (this type of machine being disclosed in my co-pending application Serial No. 570,621, filed July 6, 1910 and my Patent No. 1,248,664, December 4, 1917), I wish it to be understood that the present invention is not to be considered as limited in its use to a machine so organized. The mechanisms of my invention might be adapted, by the exercise of mere mechanical skill, to other glass making machinery. The embodiment of my invention herein disclosed is susceptible of modification in constructional details without departure from the invention set forth in the claims.

I claim:

1. In apparatus for manufacturing glass, the combination of a vessel to contain molten glass, gathering mechanism and means for moving the same across the glass in said vessel, said mechanism comprising a hollow oscillatable member, a gathering mold thereon arranged at an angle to the axis thereof, means for giving partial rotations to said oscillatable member so as to dip the mold into the glass and thereafter turn it to its original position while the gathering mechanism is over said vessel; said mold consisting in part of separable mold elements, and means extending through said oscillatable member for opening and closing said mold elements.

2. In apparatus for manufacturing glass, the combination of a vessel to contain molten glass, a hollow oscillatable member, a gathering mold on said oscillatable member arranged substantially transversely to the axis thereof and comprising separable mold elements, means for giving partial rotations to said oscillatable member, and a pair of yieldingly connected plungers extending through said oscillatable member for opening and closing said mold elements.

3. In apparatus for manufacturing glass, the combination of a vessel to contain molten glass, gathering mechanism and means for moving the same over the glass in said vessel, said mechanism comprising a gathering mold, an oscillatable elbow-shaped supporting device for the mold, means for oscillating the same while the gathering mechanism is over said vessel so as to bring the gathering end of the mold into and out of contact with said glass, said mold comprising separable elements, and means for opening and closing the same.

4. In apparatus for manufacturing glass, the combination of a vessel to contain molten glass, a revoluble supporting structure, an oscillatable member formed with spiral slots, guides on said supporting structure for said oscillatable member, slides arranged between said guides provided with rollers adapted to extend into said slots, a cam-actuated reciprocating element to which said slides are attached; and to which longitudinal movements are imparted by the revolving movement of said supporting structure; said gathering mold comprising separable mold elements, and a cam-actuated reciprocating element driven by the revolution of said supporting structure which extends through the oscillatable member for opening and closing said mold elements.

5. In apparatus for manufacturing glass, the combination of a vessel to contain molten glass, an oscillatable gathering mold comprising separable mold elements, a pair of plungers, a spring interposed between said plungers, toggle links connecting one of said plungers with the mold elements for the purpose of opening and closing the same, and means for reciprocating the other plunger.

6. In apparatus for manufacturing glass, the combination of a vessel to contain molten glass, a hollow oscillatable member, a gathering mold thereon arranged transversely to the axis thereof, said mold comprising separable mold elements pivotally mounted on said oscillatable member, a plunger within said oscillatable member, toggle links connecting said plunger with said mold elements, a second plunger in said oscillatable member having a bore through which a portion of the first-named plunger extends, a spring interposed between said plungers, an anti-friction thrust bearing in said second plunger, and an attachment on the end of said first named plunger adapted to bear upon said thrust bearing.

7. In apparatus for manufacturing glass, the combination of a vessel to contain molten glass, a revoluble support, a hollow oscillatable member on said support, a gathering mold on the oscillatable member arranged at an angle to the axis thereof and comprising pivoted separable mold elements, a cam-actuated slide to which movements are imparted through the revolution of said support, means between said slide and oscillatable member through which the latter is oscillated, a pair of plungers arranged within said oscillatable member, links connecting one of said plungers with the mold elements, a cam-actuated slide on which the other plunger is located, the movements of which are effected through the revolution of said support, and an elastic thrust connection between said plungers.

8. In apparatus for manufacturing glass, the combination of a vessel to contain molten glass, an oscillatable support, a mold thereon comprising separable sections hinged to said support, an arm pivotally mounted on said support, a knife holder pivoted to said arm, a knife on said holder in position to cut off surplus glass from the gathering mold when the latter is turned from its gathering position, a spring to yieldingly maintain the knife holder in operative position, and a spring which yieldingly holds said arm in its normal position while permitting it to be moved by one of said mold sections when the sections are separated.

9. In apparatus for manufacturing glass, the combination of a vessel to contain molten glass, an oscillatable mold, a pivotally mounted arm, a knife holder pivoted to said arm, a knife on said holder in position to cut off surplus glass from the gathering mold when the latter is turned from its gathering position, a spring to yieldingly maintain the knife holder in operative position, a spring which yieldingly holds said arm in its normal position, said knife being formed with a shank and the knife holder with a socket to receive said shank, and set screws for adjusting the angular position of the knife with respect to the knife holder.

10. In apparatus for manufacturing glass, the combination of a vessel to contain molten glass, a supporting structure, an oscillatable member thereon, a mold on the oscillatable member arranged substantially transversely to the axis thereof, said mold including pivoted separable mold elements, means for opening and closing said mold elements, an arm pivoted to said oscillatable member, a spring for yieldingly holding said arm in operative position, a knife holder pivoted to the arm, a spring interposed between the knife holder and arm, a plate provided with a shank, said knife holder being formed with a socket to receive said shank, set screws to adjust the angular position of the plate, and a cut-off knife on said plate.

11. In a glass gathering device, the combination of a support having bearings, a hollow, cylindrical member mounted in said bearings, a solid glass gathering mold having an angular shank secured in one end of said cylindrical member, a pair of separable, complementary mold sections pivoted in the end of said cylindrical member, means for rotating the cylindrical member on its longitudinal axis, and means for actuating said complementary mold sections, said actuating means including a longitudinally moving shaft mounted inside of said cylindrical member.

12. In a glass gathering device, the combination of a rotatable mold, a knife for separating surplus glass from the bottom of the mold, a pivot for the knife, a spring for resisting pivotal movement of the knife on its pivot, and means for yieldingly supporting the pivot of the knife to permit of bodily movement of the knife out of its operative position.

13. In apparatus for manufacturing glass, the combination of a vessel to contain molten glass, gathering mechanism, and means for moving the same horizontally across the glass in said vessel, said mechanism comprising a gathering mold oscillatably supported and means for giving oscillatory movements to the same, which movements bring the mold into contact with the glass and thereafter turn it to its former position while the gathering mechanism is over said vessel.

14. In apparatus for manufacturing glass, the combination of a vessel to contain molten glass, a gathering mold comprising separable sections, an oscillatable support for the mold and means for giving oscillatory movements to the same which bring the mold into and thereafter out of contact with the glass in said vessel while the gathering mechanism is over said vessel, an arm pivotally mounted on said support, a knife secured to said arm in position to cut off surplus glass from the gathering mold when the latter is turned from its gathering position, and a spring associated with the arm which yields to permit the arm to be moved by one of said mold sections when the mold sections are separated.

15. In apparatus for manufacturing glass articles, the combination of a vessel to contain molten glass, a revoluble supporting structure, gathering mechanism on said structure adapted to be brought over the glass in said vessel by the revolution of said supporting structure comprising a gathering mold which is oscillatable, and means actuated by the revolving movement of said supporting structure for giving oscillatory movements to the mold while over said vessel, which movements bring the mold into and out of contact with the glass in the vessel.

16. In apparatus for manufacturing glass articles, the combination of a revoluble vessel to contain molten glass, a revoluble supporting structure, gathering mechanism on said structure adapted to be brought over the glass in said vessel by the revolution of said supporting structure comprising a gathering mold which is oscillatable, and means actuated by the revolving movement of said supporting structure for giving oscillatory movements to the mold, while over said vessel, which movements bring the mold into and out of contact with the glass in said vessel.

17. In apparatus for manufacturing glass articles, the combination of a revoluble vessel to contain molten glass having a hood formed to expose a portion of the glass at one edge of the vessel, gathering mechanism on said structure adapted to be brought over the glass in said vessel by the revolution of said supporting structure comprising a gathering mold which is oscillatable, and means actuated by the revolving movement of said supporting structure for giving oscillatory movements to the mold while over the exposed portion of the glass in said vessel, which movements bring the mold into and out of contact with the glass in said vessel.

18. In apparatus for manufacturing glass articles, the combination of a vessel to contain molten glass, a revoluble supporting structure, gathering mechanism on said structure adapted to be brought over the glass in said vessel by the revolution of said supporting structure comprising a gathering mold which is oscillatable, means actuated by the revolving movement of said supporting structure for giving oscillatory movements to the mold while over said vessel, which movements bring the mold into and out of contact with the glass therein, and receiving means on said revoluble supporting structure adapted to receive the blank gathered by said gathering mechanism.

19. In apparatus for manufacturing glass articles, the combination of a vessel to contain molten glass, a revoluble supporting structure, gathering mechanism on said structure adapted to be brought over the glass in said vessel by the revolution of said supporting structure comprising a gathering mold which is oscillatable, means actuated by the revolving movement of said supporting structure for giving oscillatory movements to the mold while over said vessel, which movements bring the mold into and out of contact with the glass therein, said gathering mold being provided with separable sections, means for causing the same to open when the mold is in the reverse position from its gathering position, and a blank receiving device arranged to take the blank from the gathering mold while the latter is in said reversed position.

AUGUST KADOW.